United States Patent [19]

Mock et al.

[11] Patent Number: 5,457,591
[45] Date of Patent: Oct. 10, 1995

[54] CURRENT OVERLOAD PROTECTION CIRCUIT

[75] Inventors: Rene D. Mock, Mine Run; Scott C. Willis, Manassas, both of Va.

[73] Assignee: Loral Federal Systems Company, Bethesda, Md.

[21] Appl. No.: 371,718

[22] Filed: Jan. 12, 1995

[51] Int. Cl.$^6$ .................................................. H02H 7/10
[52] U.S. Cl. ................................. 361/18; 361/89; 361/91
[58] Field of Search ................................ 361/18, 74, 75, 361/91, 89

[56] References Cited

U.S. PATENT DOCUMENTS

| | | |
|---|---|---|
| 3,373,341 | 3/1968 | Wattson . |
| 3,386,005 | 5/1968 | Roland et al. . |
| 4,156,885 | 5/1979 | Baker et al. ............................ 361/100 |
| 4,217,616 | 8/1980 | Jessup ...................................... 361/31 |
| 4,348,709 | 9/1982 | Mauk et al. .............................. 361/92 |
| 4,581,540 | 4/1986 | Guajardo ................................. 307/117 |
| 4,706,160 | 11/1987 | Kugelman ............................... 361/100 |
| 4,882,782 | 11/1989 | Kimizuka et al. ...................... 361/100 |

FOREIGN PATENT DOCUMENTS 290517A 10/1983 German Dem. Rep. .
288938A 10/1983 German Dem. Rep. .

*Primary Examiner*—Todd DeBoer
*Attorney, Agent, or Firm*—Lane, Aitken & McCann

[57] ABSTRACT

In a current overload protection circuit, a full wave rectifier bridge circuit is connected between an AC or DC power source to supply AC or DC power to a load through the output circuit of a solid-state relay. A current sensing resistor is connected across the DC terminals of the bridge circuit to sense the magnitude of the current flowing through the load. When an overload fault occurs, the voltage developed across the current sensing resistor will trigger a shunt regulator to turn on an optical isolation circuit, which upon being turned on will discharge a capacitor in an RC timing circuit. The discharge of the capacitor and the RC timing circuit triggers a Schmidt trigger circuit, which cuts off current flow to the input circuit of the solid-state relay, thereby cutting off current to the load. The shunt regulator then turns off de-energizing the optical isolator which, upon being de-energized, causes the current discharge path of the capacitor to be interrupted. The capacitor then charges through the resistor of the RC timing circuit and, upon being charged up to a predetermined level, will actuate the Schmidt trigger circuit to again allow current to flow through the input circuit of the solid-state relay, thus allowing current to again flow through the load.

10 Claims, 1 Drawing Sheet

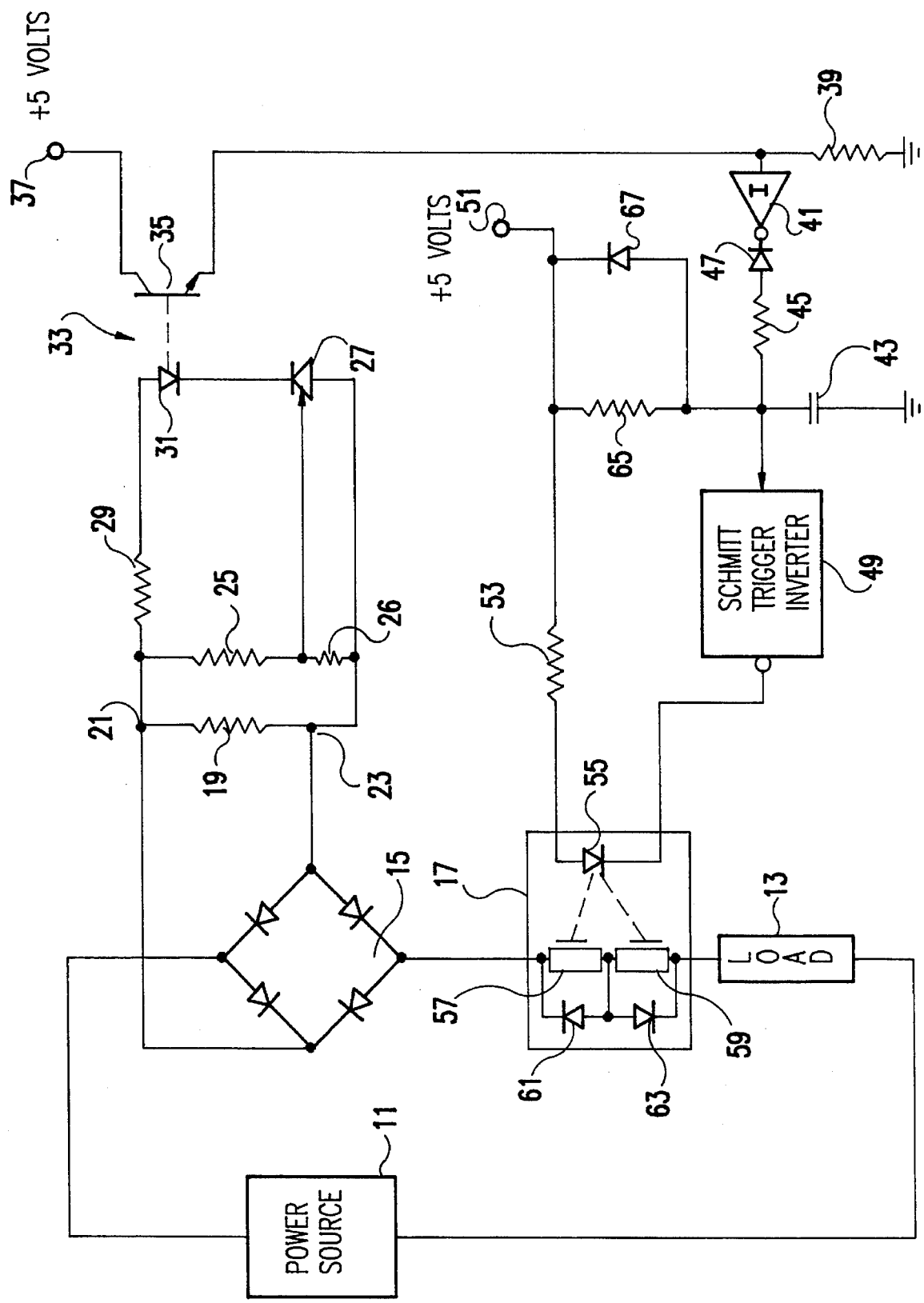

CURRENT OVERLOAD PROTECTION CIRCUIT

BACKGROUND OF THE INVENTION

1. Field of the Invention

This invention relates to a current overload protection circuit which will interrupt current flow from a power source to a load operable with both AC and DC power sources.

2. Background of the Invention

The problem of current overload protection is typically solved by the use of fuses or circuit breakers which suffer from the disadvantage in some applications in that they cannot be automatically reset. Resettable fuses are available, but such fuses usually employ temperature coefficient resistors which increase their resistance with current increases. Such resettable fuses do not provide precise repeatable performance.

When the power source is limited to a DC power source, current overload protection has been achieved by means of a series pass transistor. However, to use this solution for an AC power source, all of the circuitry of the protection circuit must be duplicated. A relay operated in response to current detection circuitry has been used in some applications. However, relays require a lot of circuit board real estate. Solid-state relay circuits for current overload protection suffer from the disadvantage of being susceptible to operation in a linear region between full on and full off causing excessive heating and power dissipation. In addition, they require excessive packaging volume when several isolated loads have to be protected due to the requirement for a dedicated power supply for each protection circuit to maintain isolation.

The present invention improves on prior art solutions by requiring a minimum number of components, all of which are readily available, to protect both AC and DC high voltage loads and the system is readily expandable to protect multiple, isolated loads without requiring isolated power sources for individual protection circuits protecting different isolated loads.

SUMMARY OF THE INVENTION

In accordance with the invention, a current sensing resistor is connected with a bridge rectifier to receive load current flowing in one direction for both polarities of current flowing through the load. The voltage developed across the current sensing resistor is connected to the reference input of a shunt regulator. When the voltage across the sensing resistor increases to a predetermined value representing a fault condition, the input voltage to the regulator turns the regulator on. This action energizes a light emitting diode in an optical isolator, turning on the transistor of the optical isolator. The output current from the optical isolator transistor actuates an inverter circuit to discharge a capacitor. The discharging of the capacitor triggers a Schmidt trigger connected to the input of a solid-state relay and causing the solid-state relay to turn off. The output circuit of the solid-state relay is connected in series with the load and, thus, the current to the load is interrupted in response to the current overload. The circuit automatically resets after a time delay determined by an RC timing circuit.

BRIEF DESCRIPTION OF THE DRAWING

The single FIGURE of the drawing illustrates the current overload protection circuit of the present invention.

DESCRIPTION OF A PREFERRED EMBODIMENT

As shown in the drawing, a power source 11 supplies AC or DC power to a load 13. The power is supplied through a full wave bridge rectifier 15 which is connected with its AC terminals in series with the load to supply AC or DC power from the source 11 to the load 13. The output circuit of a solid-state relay 17 is connected in series between the full wave rectifier bridge circuit 15 and the load 13. A resistor 19 is connected across the DC terminals of the bridge 15 between circuit junctions 21 and 23 so that both cycles of AC current from the power source 11 will flow in the same direction through the resistor, from circuit junction 21 to circuit junction 23. The resistor 19 is the current sensing resistor and a voltage is developed across the resistor 19 proportional to the amount of current flowing through the load 13. A voltage divider formed by resistors 25 and 26 is connected between the circuit junctions 21 and 23 to apply a portion of the voltage developed across the resistor 19 to the reference terminal input of a shunt regulator 27. The circuit junction 21 is also connected through a resistor 29 and a light emitting diode 31 of an optical isolator 33 to the cathode of the shunt regulator 27. The anode of the shunt regulator diode 27 is connected to the circuit junction 23. The shunt regulator 27 may be implemented by the Motorola TL431,A integrated circuit.

Normally, the shunt regulator 27 will be nonconducting. When the voltage across the sensing resistor 19 rises above a predetermined threshold value selected to indicate an overload or fault condition, the voltage applied between the reference input terminal and the anode of the shunt regulator will cause the regulator 27 to become conductive so that current will flow through the light emitting diode 31. The light emitting diode 31 upon being energized will then irradiate the light responsive element 35 of the optical isolator 33 causing the light responsive element 35 to turn on. The light responsive element 35 is a transistor and when it turns on, current will flow from a 5 volt source applied at terminal 37 through the transistor 35 and through a resistor 39 to ground. The junction between the transistor 35 and the resistor 39 is applied to the input of an inverter 41 and the current flowing through the resistor 39 will cause the voltage at the input of the inverter 41 to rise. As a result, the voltage at the output of the inverter 41 will drop, which action will discharge a capacitor 43 by current flowing from the capacitor 41 through a resistor 45 and a diode 47. The capacitor 43 is connected in series with a resistor 53 between ground and the input of a Schmidt trigger inverter 49, which is triggered in response to the discharge of the capacitor 43 and causes its output to go high. The input circuit of the solid-state relay 17 comprises a light emitting diode 55, which is connected in series with a resistor 53 between the output of the Schmidt trigger 49 and a source of +5 volts applied at a terminal 51. When the output voltage from the Schmidt trigger is low, current will flow from the terminal 51 through the resistor 53 and the input circuit of the solid-state relay maintaining the output circuit of the solid-state relay 17 conducting. When the output of the Schmidt trigger 49 goes high in response to the discharge of the capacitor 43, the input circuit of the solid-state relay 17 is rendered nonconductive, thus shutting off current flow in the output circuit of the solid-state relay 17 and disconnecting the power source 11 from the load 13.

The solid-state relay 17 is an optically isolated type and provides for bidirectional current flow in the output circuit in response to current flow in the input circuit and may be implemented by a Teledyne Model C60 or SC60 solid-state relay. The input circuit of the solid-state relay comprises a light emitting diode 55 which, when energized, emits light to the gates of field effect transistors 57 and 59 connected in series with reverse polarities. The field effect transistors are connected with diodes 61 and 63 so that one cycle of AC current will pass through the field effect transistor 57 and diode 63 and the other cycle of AC current will pass through the field effect transistor 59 and diode 61 when the field effect transistors 57 and 59 are rendered conductive in response to receiving light from the energized light emitting diode 55.

When the output of the Schmidt trigger 49 goes high interrupting current flow through the input circuit of the solid-state relay 17 and thereby interrupting current through the load 13, current flow through the sensing resistor 19 will cease and the shunt regulator 27 will again become nonconducting. As a result, the transistor 35 will cut off, the input to the inverter 41 will go low, and output of the inverter 41 will back bias the diode 47.

The ungrounded plate of the capacitor 43 is connected to the 5 volts applied at terminal 51 through a resistor 65 so that when the diode 47 is cut off, the capacitor 43 will begin to recharge through the resistor 65, which has a substantially greater resistance than the resistor 45. The resistor 65 and the capacitor 43 form an RC timing circuit. As the capacitor recharges the voltage applied to the input of the Schmidt trigger inverter 41 will rise. When the potential has risen to a predetermined level, the voltage will activate the Schmidt trigger 49, which will then switch its output low causing current to again flow through the diode 55 in the input current of the solid-state relay 17 so that the output circuit of the solid-state relay 17 is again rendered conductive and current will again flow through the load 13. In this manner, the circuit automatically resets itself after cutting off current through the load in response to a current overload condition. The resetting occurs after a time delay determined by the RC time constant of the RC timing circuit.

The capacitor 43 and the resistor 65 as described above comprise an RC timing circuit, which is set by being discharged by the inverter 41 allowing current to flow through the diode 47 and then is activated to start its time delay by current through the diode 47 being cut off. The Schmidt trigger cuts off current flow through the input circuit of the solid-state relay 17 in response to the setting of the timing circuit and starts current flow through the input circuit of the solid-state relay 17 in response to the expiration of the time delay, which is started by the activation of the timing circuit.

A diode 67 is connected to allow current flow from the ungrounded plate of the capacitor 43 to the terminal 51 to provide a rapid discharge path for the capacitor 43 during start-up to remove any residual charge on the capacitor 43 so that the solid-state relay will not be energized until the 5 volt power supply is up to its operating value.

The circuit operation described above has assumed an AC power source 11, but it will be apparent that the circuit will also operate in response to a DC power source applied to the load 13 of either polarity. It will be noted that the power supply for the circuit applied at terminals 37 and 51 is completely isolated from the load 13. Accordingly, a common power supply can be provided to multiple overload protection circuits for different isolated loads.

The above-described circuit will survive a dead short and handle signals with several hundred volt peaks, has minimum power dissipation, has a small footprint to facilitate replication for multiple loads and is of relatively low cost involving no custom parts. In the system as described above, the reference load is determined by the resistance of the current sensing resistor 19 and the response time is immediate. It will be apparent that resistors and capacitors could be readily added to the circuit to vary the threshold load current at which the circuit is triggered as well as the response time of the circuit. Capacitors and/or Zener diodes may be added to the circuit for voltage spike protection across the bridge rectifier or across the shunt regulator and optical isolator circuit. These and other modifications may be made to the above-described invention without departing from the spirit and scope of the invention which is defined in the appended claims.

What is claimed is:

1. A circuit overload protection circuit comprising a full wave rectifier circuit having AC and DC terminals, a solid-state relay having an output circuit connected in series with said AC terminals of said rectifier circuit and having an input circuit, said solid-state relay rendering said output circuit conductive or nonconductive to AC or DC current in response to current flow in said input circuit, a current sensing resistor connected across said DC terminals of said rectifier circuit to receive the current level flowing in series with said AC terminals of said rectifier circuit, an optical isolator circuit having a light emitter arranged to irradiate a light responsive element when energized, said light responsive element being normally nonconductive and being rendered conductive in response to being irradiated by light emitted by said light emitter, means to energize said light emitter when the current flowing through said current sensing resistor is above a threshold value and to de-energize said light emitter when the current flowing through said load is cut off, a timing circuit for starting a time delay upon being activated, means responsive to current flowing in said light responsive element to set said timing circuit and to then activate said timing circuit, Schmidt trigger means responsive to the setting of said timing circuit to cut off current flow through the input circuit of said solid-state relay cutting off current flow in the output circuit of said solid-state relay and responsive to expiration of said time delay to apply current flow to the input circuit of said solid-state relay to render the output circuit of said solid-state relay conductive at the expiration of said time delay.

2. A current overload protection circuit as recited in claim 1, wherein said means to energize said light emitter comprises a shunt regulator.

3. A current overload protection circuit as recited in claim 2, wherein said shunt regulator has a cathode and anode connected in series with said light emitter and has a reference terminal, said shunt regulator being rendered conductive in response to the voltage applied between said reference terminal and said anode rising above a predetermined value and becoming nonconductive upon current being cut off to said load, means to apply at least a portion of the voltage developed across said current sensing resistor between said reference terminal and said anode.

4. A current overload protection circuit as recited in claim 3, wherein said means to apply the voltage developed across said current sensing resistor between said reference terminal and said anode comprises a voltage divider connected across said current sensing resistor.

5. A current overload protection circuit as recited in claim 1, wherein said Schmidt trigger means comprises a Schmidt trigger circuit connected to one side of the input circuit of said solid-state relay, the other side of said input circuit being connected to a DC power supply, said Schmidt trigger circuit changing the voltage applied to said one side of the input circuit of said solid-state relay in a direction to cut off current flow through the input circuit of said solid-state relay in response to the setting of said timing circuit.

6. A current overload protection circuit as recited in claim 1, wherein the input and output circuits of said solid-state relay are optically isolated.

7. A current overload protection circuit as recited in claim 1, wherein said timing circuit is an RC circuit comprising a capacitor and a resistor.

8. A current overload protection circuit as recited in claim 7, wherein said means responsive to current flowing in said light responsive element comprises an inverter and means to apply a signal voltage to the input of said inverter corresponding to the current flow through said light responsive element and a current path connecting between the output of said inverter and one plate of said capacitor.

9. A current overload protection circuit as recited in claim 8, wherein said current path connection between said one plate of said capacitor and the output of said inverter includes a diode connected with the polarity to allow current flow through said diode when said timing circuit is set, said inverter cutting off current flow through said diode to activate said timing circuit.

10. A current overload protection circuit as recited in claim 7, wherein said timing circuit is set by discharging said capacitor through a discharge circuit and wherein said timing circuit is activated to start said time delay by cutting off current flow through said discharge circuit.

\* \* \* \* \*